United States Patent [19]
Mattsson

[11] Patent Number: 5,233,284
[45] Date of Patent: Aug. 3, 1993

[54] SYSTEM AND METHOD FOR RAPID CHARGING OF A BATTERY

[76] Inventor: Bertil Mattsson, Båtsmanskroken 26, Hägersten, Sweden, 126 57

[21] Appl. No.: 689,771
[22] PCT Filed: Nov. 24, 1989
[86] PCT No.: PCT/SE89/00682
   § 371 Date: May 16, 1991
   § 102(e) Date: May 16, 1991
[87] PCT Pub. No.: WO90/06615
   PCT Pub. Date: Jun. 14, 1990

[30] Foreign Application Priority Data

Nov. 25, 1988 [SE] Sweden .................. 8804267

[51] Int. Cl.$^5$ ........................................ H02J 7/04
[52] U.S. Cl. ............................ 320/14; 320/32; 320/39
[58] Field of Search ................. 320/32, 39, 40, 14

[56] References Cited

U.S. PATENT DOCUMENTS

| | | | |
|---|---|---|---|
| 3,586,955 | 6/1971 | Kisiel | 320/39 |
| 3,864,617 | 2/1975 | Smith et al. | 320/39 X |
| 3,886,428 | 5/1975 | Macharg | 320/39 |
| 3,987,353 | 10/1976 | Macharg | 320/39 |
| 4,246,529 | 1/1981 | Jurgens et al. | 320/39 |
| 4,270,080 | 5/1981 | Kostecki | 320/39 X |

Primary Examiner—R. J. Hickey
Attorney, Agent, or Firm—Nixon & Vanderhye

[57] ABSTRACT

Method and apparatus for high-rate charging of batteries with sealed cells, whereby through supplied charging current the efficiency the single battery cell is actively influenced such that the charging time and temperature rise of the cell is minimized such that in a first step the battery is discharged to a voltage $U_B$ slightly higher than a first reference voltage ($U_o$) whereafter in a first recharging step the supplied charging current $I_B$ is controlled progressively increasing according to the function $I_B = k(U_B - U_o)$ where k is an adjusted constant, until the pole voltage has reached a second reference voltage $U_B - \hat{u}$ where $\hat{u}$ is maximum batter voltage and in a second charging step the charging current $I_B$ is controlled through voltage feedback such that $U_B \approx \hat{u}$ whereby the amount of the supplied charging current is determine by the charging state of the battery cells. The first and second charging step can also be repeated with a fixed time interval with a free running time interval without charging current a number of cycles until a state of full charge is reached.

7 Claims, 4 Drawing Sheets

SYSTEM AND METHOD FOR RAPID CHARGING OF A BATTERY

The present invention refers to a method and a device to supply electric energy to a rechargeable battery in such a way that a substantial reduction of the charging time is obtained compared to previously known methods and devices. The method according to the invention is mainly intended for Ni-Cd batteries.

TECHNICAL PROBLEM

A conventional method of charging especially sealed Ni-Cd batteries is supplying a constant current during a certain time which in itself is a simple and reliable method. The manufacturers of this type of batteries recommend a charging current of 0.1 times the capacity of the cell (0.1 C Amperes)*, which gives more than 10 hours of charging. Moreover in order to obtain a fully charged battery at this low charging current an extra time of 4 hours is required for full charge. Thus the total charging time with conventional methods is about 14 hours. The value of the charging current is defined by the quantity of oxygen that can be burned at the Cd-electrode in a fully charged state of the cell. In order to explain the function of a Ni-Cd - cell, accompanying FIGS. 1A, 1B and 1C show different measured charging characteristics constant charging current in which particularly \* C refers to the numerical value of the battery capacity in Ampere hours (Ah)

FIG. 1A shows cell voltage as a function of input charge at a certain charging current (0.2 C) at different temperatures.

FIG. 1B shows charging acceptance or charging efficiency for different constant charging currents at room temperature FIG. 1C shows charging acceptance or charging efficiency at room temperature being the ambient temperature at different cell temperatures with a normal charging rate of 0.1 C.

The problem being fundamental to the invention is that a user must have access to spare batteries for continuous operation of a battery operated system if the decharging time is shorter than charging time. A charging time of 14 hours and a decharging of 1h demands 14 batteries for continuous operation of the system.

State of the art

Through the U.S. Pat. No. 4,246,529 a battery charger is known in which is used integrator means (4) an current switching means (8) in combination with a control circuit (7) whereby the control circuit receives a synchronizing signal at the start of each cycle as determined by a cyclical supply or pulse generator as well as information about the state of the integrator means which is compared with the predetermined average current. This information determines the required control signals for the integrator means and current switch means so as to maintain the value of average charging current substantially constant throughout the charging time. Current sense means (5) are provided to sense the current flow through the battery and supply the integrator (4) with said current.

In the above u-processor controlled battery charger for lead acid batteries the energy is pulsed with relatively short pulses into the battery and the average current is measured which can be expressed as $$I_{av} = 1/\pi \int_{\theta_1}^{\theta_2} (V_c - V_b)/R_3 \, d\theta$$

where $V_c$=charging voltage, $V_b$=battery pole voltage $R_3$=current sense resistance and $\theta$=current angle In this system the charging efficiency of the battery is not considered for different charging currents. The equation above does not show the progressively increasing initial course of charging current which is produced by the system according to the present invention.

Through U.S. Pat. No. 3,987,353 is known a battery charging control system in which the charging current is switched on and off at repeated intervals, whereby the open battery voltage during the "off" periods is used to generate a control signal to vary the magnitude of the charging current during "on" periods. The control signal is derived through extracting the resultant internal voltage drop (I. R Drop) at the battery connections when the charging current is switched off and thereafter differentiate the rate of decay of the battery voltage by means of the differentiator (30). A voltage is then derived from the differential signal and is used in one of three ways to control the magnitude of the charging current in order to progressively reduce its magnitude once gas generation has been detected as a result of a significant differential occurring.

In the above related control system for battery chargers which operates with pulses divided from the line frequency and evidently intended for lead acid batteries, the magnitude of charging current is modified as a function of the charging state of the battery which has been derived from the "gas drop". The charging characteristics is related to the efficiency but is not directed to high-rate charging.

OBJECTS OF THE INVENTION

A first object of the invention is to minimize the charging time as far as possible by making use of the intrinsic properties of the Ni-Cd cell. A second object of the invention is to accomplish as high efficiency as possible at indicated charging conditions.

TECHNICAL SOLUTION

The problem is solved according to the present invention by using a specific property of the battery cell in such a way that, the larger charging current input in the cell, the greater charging acceptance or charging efficiency is obtained, see diagram A in FIG. 1. The charging time is shortened, partly because of the higher charging current and partly because of the higher acceptance or efficiency. This charging method according to the invention moreover has the favorable effect that, when the acceptance is enhanced, less of the input energy is transformed into heat, which acts to restrict the temperature rise in the cells.

As can be seen from the diagram in FIG. 1C the temperature of the cell should be kept as low as possible for high acceptance or efficiency to be maintained. The basic idea in the present invention is that the intrinsic properties are used actively in such a way that highest possible acceptance for charging is obtained, which minimizes the charging time. The upper limit of the charging current depends on physical and chemical reasons such as the current density at the and the recombination of oxygen at the cadmium electrode. When verifying the method according to the invention a maximum current of about 2.5* C Amperes has been used.

The charging method according to the present invention gives rise to a progressive process, since the charging current increases as the input electrochemical charge increases. The increase in current is controlled by the voltage of the battery, which according to the diagram in FIG. 1A increases with input charge.

According to the invention the voltage level of the battery is used a coarse indication of full charge and transformed to a signal which is used for switching to charge with constant voltage.

Since the acceptance is not complete or efficiency of 100% cannot be obtained, a certain heating of the cells happens during charging. As can be read from the diagram in FIG. 1A the voltage hunch of the curve decreases with increasing cell temperature and with this the possibility to positively detect an appropriate switching level (at constant charging current). A progressively increasing charging current enhances the voltage hunch which is thus favorable.

Before start of charging the battery is discharged and relatively low initial current is chosen (about 0.5 C Amps) in order to avoid stress on the cells.

BRIEF DESCRIPTION OF THE DRAWINGS

With reference to accompanying drawings a first and a second embodiment of a battery charging circuit which perform the method of charging according to the present invention will be described.

FIGS. 3A and 3B are time diagrams over different charging processes of which FIG. 3A shows charging at room temperature and FIG. 3B shows charging at $-20°$ C.;

With reference to FIG. 2 a Ni-Cd battery with the pole voltage $U_B$ via a control transistor 20 and current limiting resistor 41, which is also used as an integration resistor, connected to a DC voltage source 4. A control circuit 2 is connected to the base of the control transistor 20 and on one hand contains an amplifier 200 and on the other voltage comparators 210 and 220. The comparator 210 has on one of the inputs maximum battery voltage u as a reference and on the other $U_B$. The comparator 220 on one of the inputs has a start voltage $U_O$ as a reference and on the other input $U_B$. The level shift signals from the comparators 210 and 220 are supplied to a control unit 3 which contains memory and timing circuits so that charging can be supplied to the battery during certain time intervals and absorbed energy measured during the whole charging process.

To form a control circuit to control the charging current the control circuit 2 is by way of a switch connected to summing points 22 and 23, of which the summation point 22 forms $U_B - U_O$ and 23 forms $u - U_B$ where u and $U_O$ are reference voltages as above. $U_B$ is supplied to the control circuit 2 and the summation points 22, 23 by way of the measure or sense line 112.

Figure 3A:
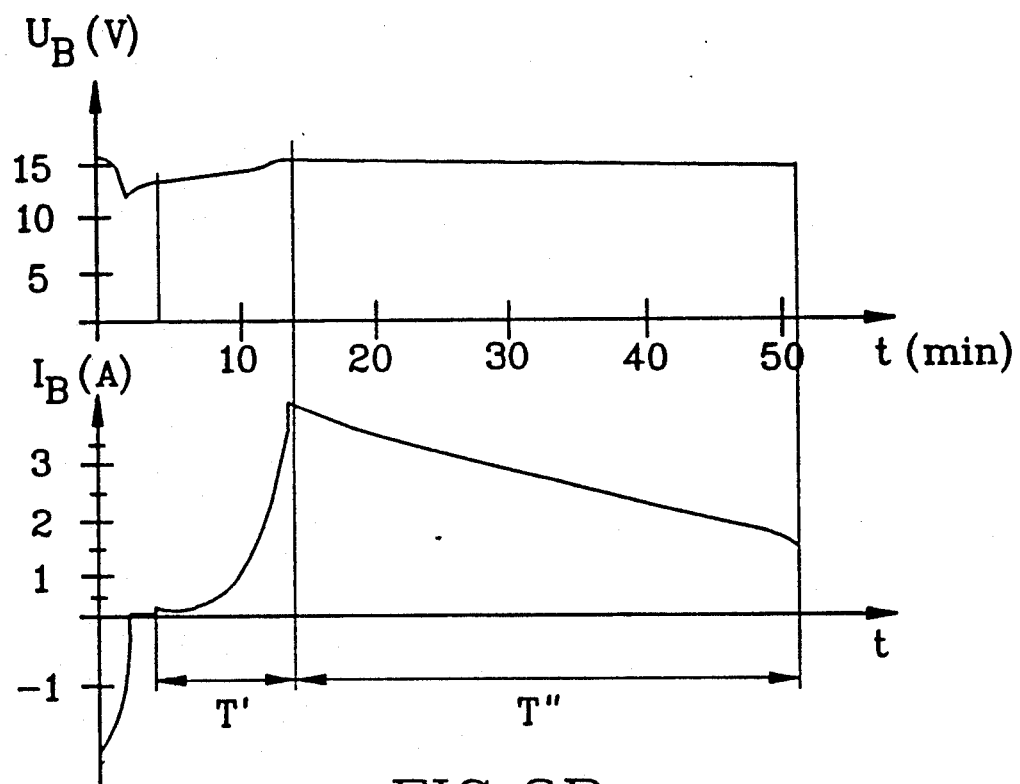
Figure 3B:
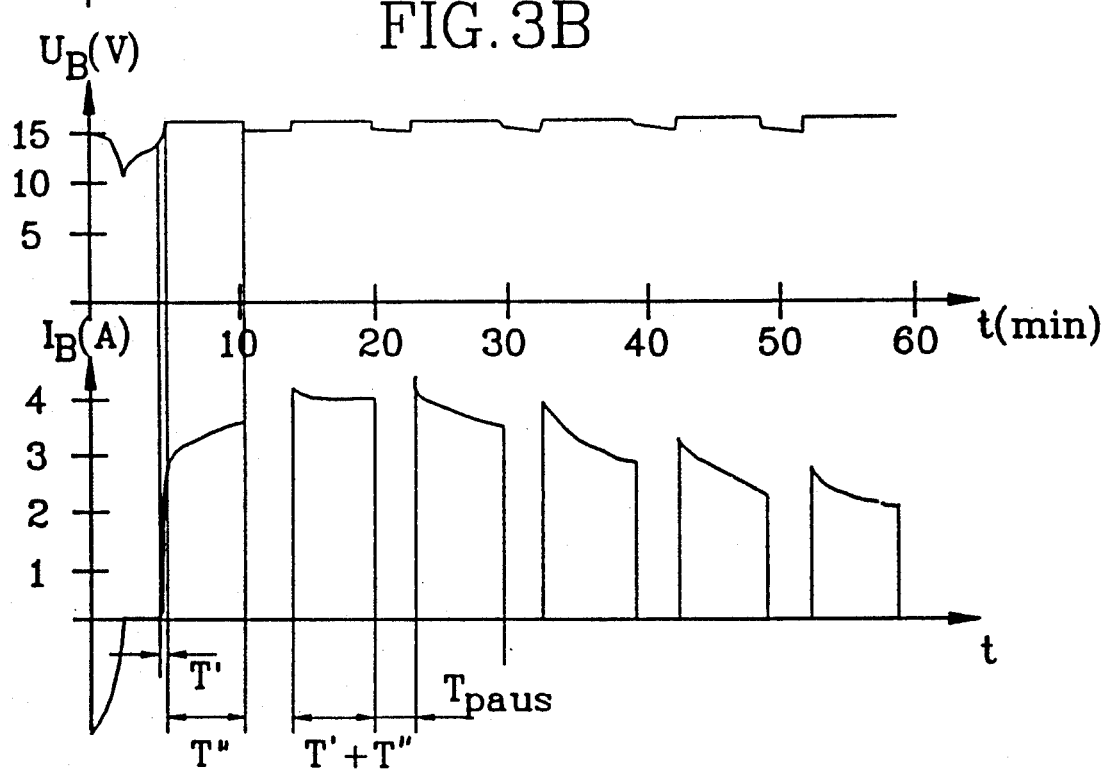

With reference to the diagrams in FIGS. 3A and 3B charging processes are described, which are o with a device according to the above.

Before a charging process is started, the battery is discharged in order to obtain a correct reference level for charging (with reference level is referred to as $\approx 0$ available charge) and supplied charge to be measured during a charging process. The discharge occurs by the control circuit activating the switch 21. The discharge time is defined by comparing $U_B$ with $U_O$.

After a time of reactivation of the battery cells a new comparison with $U_O$ is carried out in the comparator 220 to examine if the starting condition $U_b > U_O$ is satisfied.

When the starting condition is positive the switch 21 by way of the control circuit 3 is set in position B which gives a charging current of $$I_B = k(U_B - U_O)$$

In the initial moment $I_B$ is small, since $U_B$ is low. As the battery successively accumulates charge, the pole voltage of the battery $U_B$ increases. This voltage controls the charging current following the linear function above, which gives an increasing voltage (positive feedback). The process continues until $U_B$ reaches the reference voltage u. The comparator 210 thereby gives a level shift signal to the control unit 3, which shifts the switch 21 to position A. This first accelerated charging phase takes the time T'.

With the switch in position A a charging current $I_B$ is obtained which gives the battery voltage $$U_B \approx u$$

The system is now in a negative mode feedback and the pole voltage kept constant. As the charge of the battery increases, the charging current starts to decay. After a total charging time $T' + T''$, which has been calculated such that a battery which was from the beginning discharged has become fully charged the charging current is switched off, alternatively connected to trickle charging by way of the input 203 on the control circuit 2. By measuring supplied charge $Q_{tot}$ by means of an integrator built into the monitoring circuit and interrupt the charging when the battery has absorbed a certain amount of charge $Q_{max}$ corresponding to a fully charged battery, the precision in the time control is enhanced and the risk for overcharging is eliminated.

At low temperatures, eg. $-20°$ C. the voltage u is rapidly reached in the first charging phase which extends the charging time. By cyclically repeating the processes with the switch 21 in position A during the time T' and in position B during the time T'' with a pause $T_{pause}$ see FIG. 3B, an efficient charging in accomplished even at low temperatures. The charging current is integrated a number of cycles until a state of full charge has occurred.

In order to further enhance the efficiency and correspondingly shorten the charging time at rapid charging of a cold battery the following procedure is carried out:

A "cold" battery is cycled a number of periods where every period contains a limited charging—discharging. By this the battery is prepared chemically for a rapid charging. By reading the current in the first charging process at the voltage u and compare this current with a minimum value of $I_B$ an indication of "cold" battery is obtained and the cycling mode of above is activated.

Figure 4:
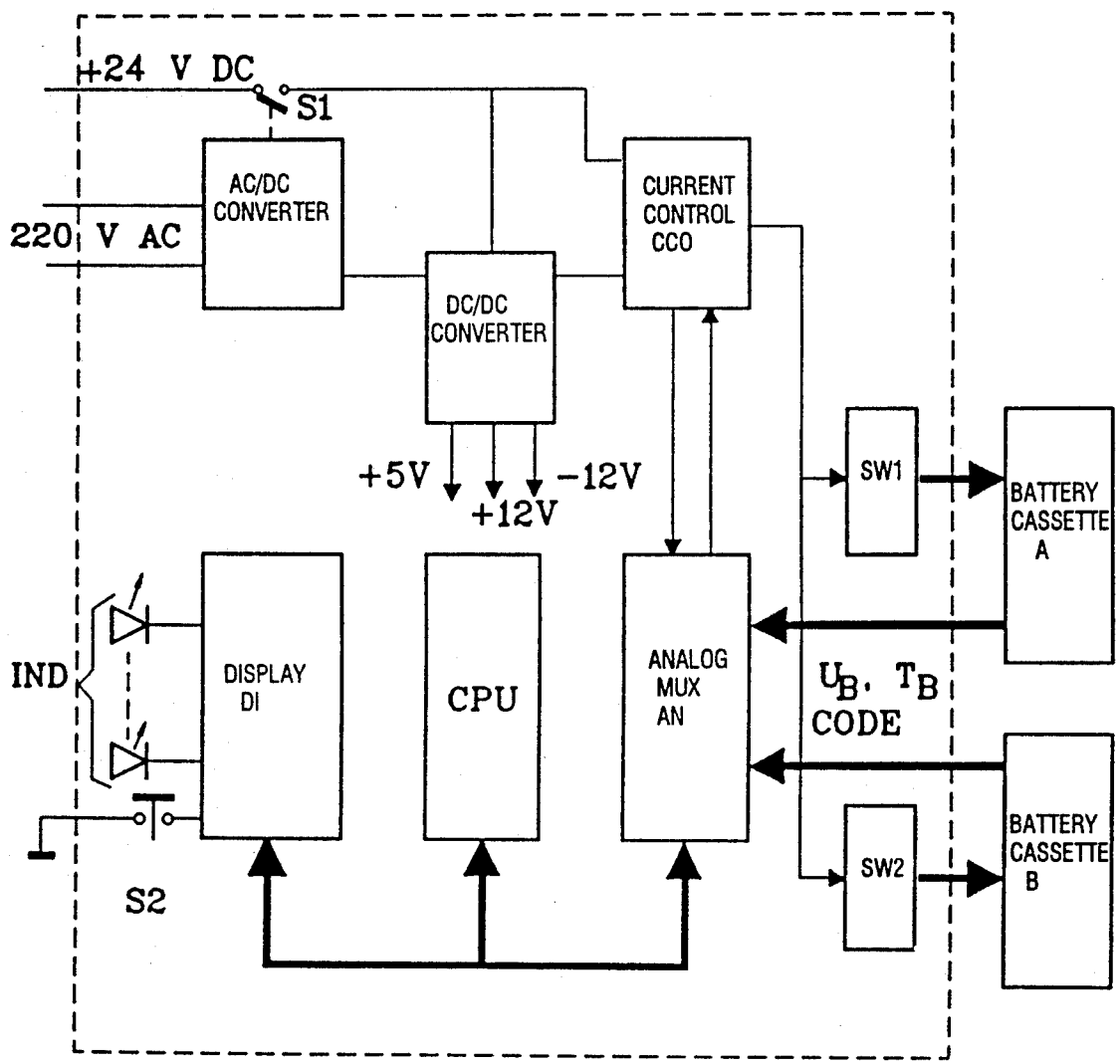
FIG. 4 is block diagram over a microprocessor based system according to a second embodiment of the invention for rapid charging of battery cassettes in which is used the charging method according to the invention.

With reference to FIG. 4 in the following a rapid charging system for battery cassettes comprising the charging circuit according to FIG. 2.

Figure 1A:
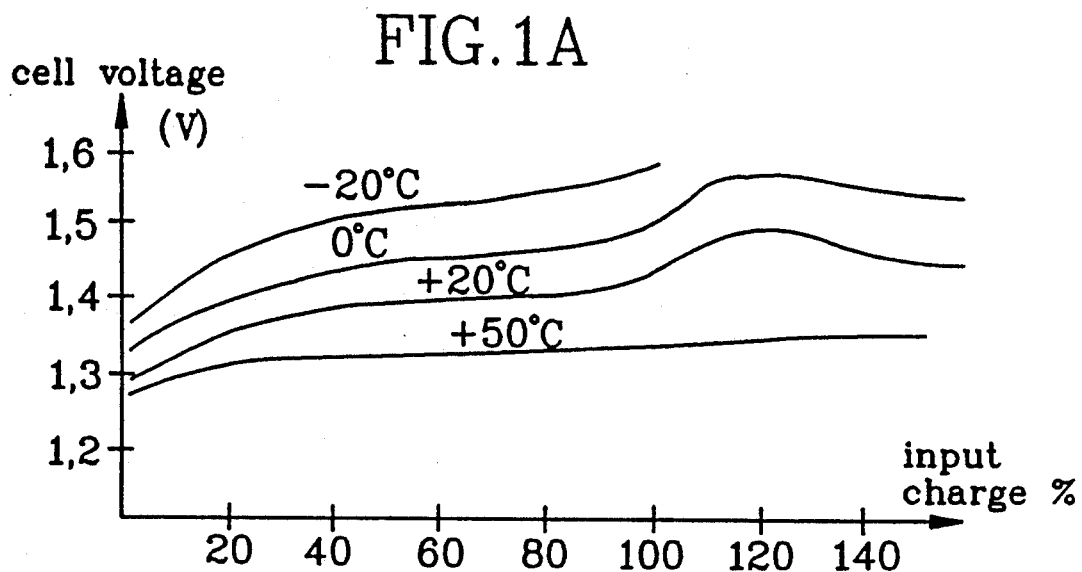
FIG. 1A, 1B and 1C are diagrams which show different measured charging characteristics at constant charging current.
Figure 1B:
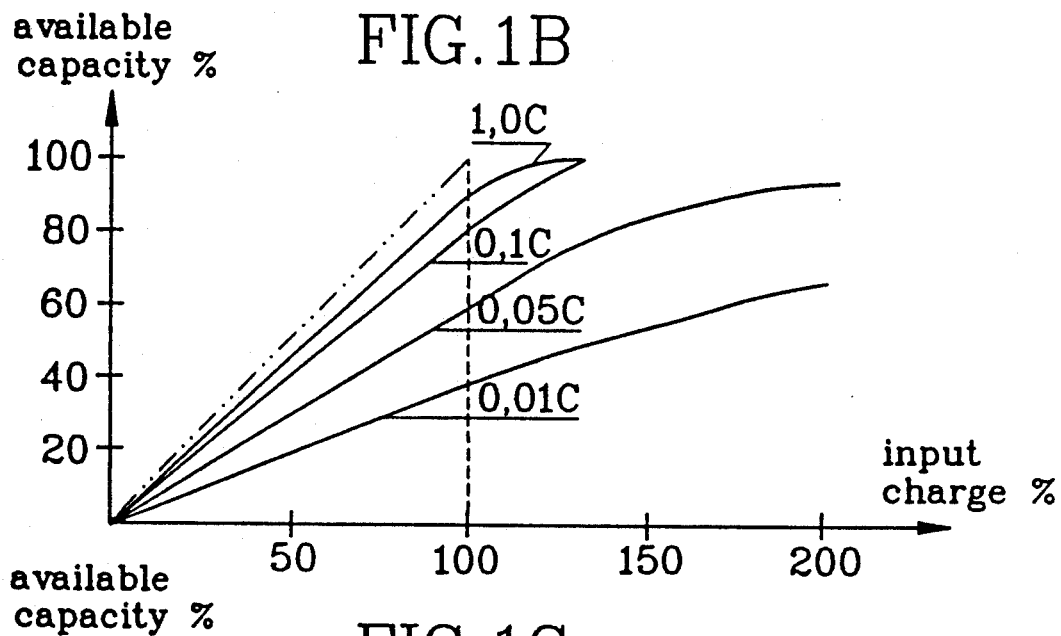
Figure 1C:
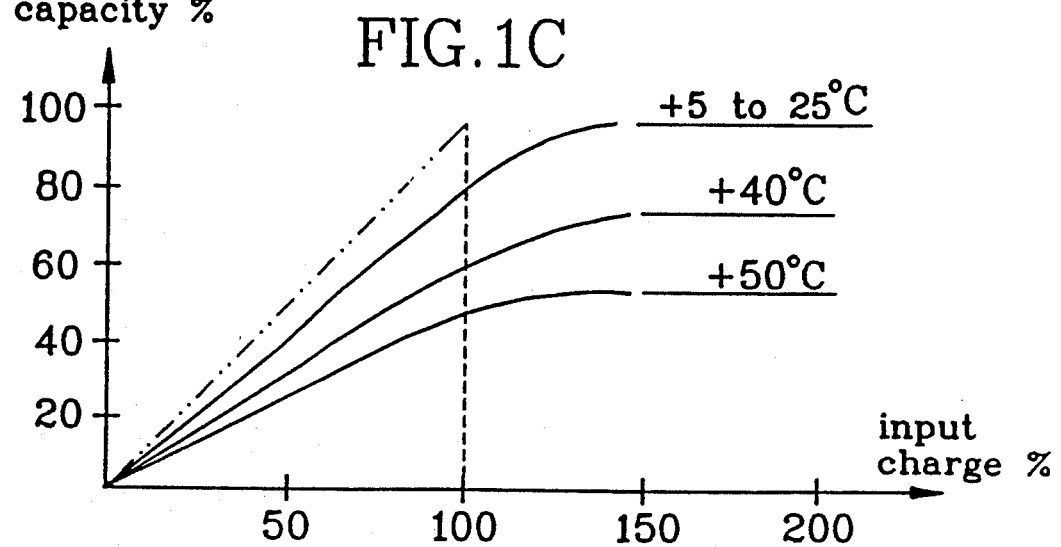
Figure 2:
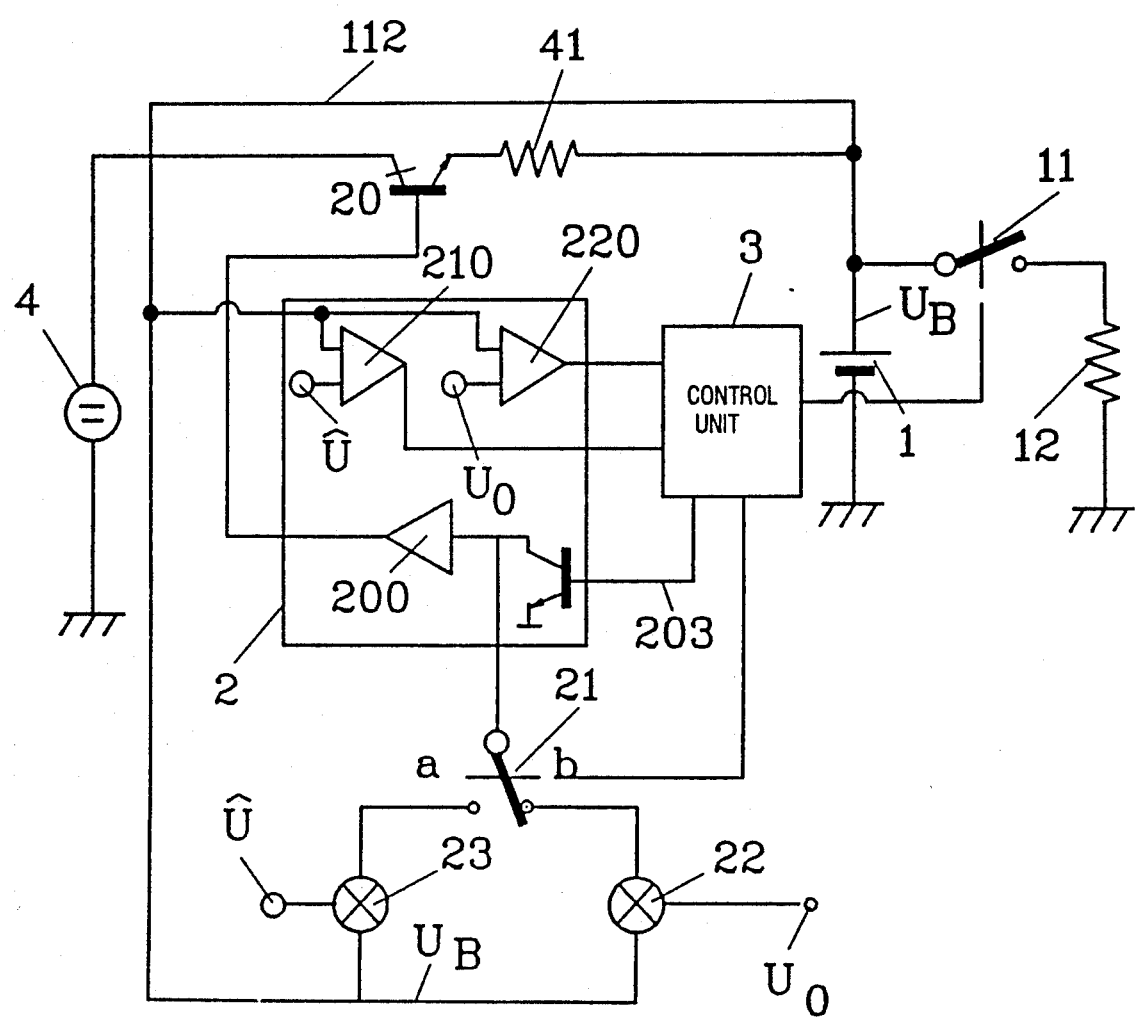
FIG. 2 is a block diagram over a charging circuit according to a first embodiment of the invention.

In the system below stated functional features are included:

Automatic control of discharging—charging of several battery cassettes simultaneously by means of a microprocessor which replaces the control circuit 2 and the control unit 3 in FIG. 2;

Automatic adjustment to correct battery type by every type of battery cassette having a unique jumper combination in the adapter;

In the control of discharging—charging process functions are included such as control of charging current, measuring of battery voltage, measuring of supplied charge and measuring of total charging time;

Charging currents, charging times etc for different battery types are coded in the program memory of the processor (PROM);

User interface which describes the charging process in the form of a light emitting diode display on which status is shown separately for all 4 batteries and a display which indicates if the A- and/or B- cassette is connected.

With reference to FIG. 4 the electronics system comprises a line block AC/DC and a separate DC converter DC/DC to supply the electronic blocks. Incoming power 220 V AC or 24 V DC is switched on and off by way of the switch S1. In the CPU- block CPU is included an 8 -bits micro-controller (Intel 80C31) which is provided with a program memory 32k EPROM, a data memory 8k SRAM, watchdog—timer circuit and a 8-bits A/D converter. The CPU- block controls and supervises the function of the battery charger and communicates via a bus line with the display block DI and the analog block AN. The analog block contains 4 units of 4-1 channel analog multiplexers with address decoders for measuring channels and choice of charging mode and a double multiplying 8 bits D/A converter for control of on one hand charging current directly from the CpU block and on the other control of the amplification $G_i$ in the current control loop. The analog block further communicates further with the current control/measuring block CCO and battery cassettes A and B. The analog block is interfaced towards the battery cassettes for control and measurement of charging current, receiving of temperature status $T_B$, measuring of pole voltage $U_B$, receiving of battery code CODE, generation of trickle charging and control of FET-switches SW1 and SW2 to connect charging current and a discharging load. The charging is started and stopped by means of the nonlocking switch S2.

The display block DI operates a number of light emitting diode indicators which for example through flashing indication shoe that work in the form of charging is carried out in a battery cassette A,B while a lighted indicator shows that a work is completed which means that the batteries in a cassette are fully charged. In order to illustrate the function of the battery charging system according to FIG. 4 an activity diagram covering a charging process is given below.

| Phase: | Activity: |
|---|---|
| 1. | The indicator "CHARGING" is activated to mark that charging is going on; |
| 2. | The timer is set to zero to measure total charging time; |
| 3. | Accumulated charge, $Q_{tot}$ is set to zero |
| 4. | The gain in the current control loop is set by means of the gain factor $G_i$; |
| 5. | Current control is activated |
| 6. | Charge measuring is started; |

-continued

| Phase: | Activity: |
|---|---|
| 7. | A current generator is connected to the battery; |
| 8. | The timer is set to zero for measuring of time in current control mode |
| 9. | If $U_B < U_{max}$ after the time $T_{icp}$ the charging current is switched off and the indicator "ERROR " is alighted; |
| 10. | Shift to voltage control when $U_B = U_{max}$; |
| 11. | The timer is set to zero for measuring of time in voltage control mode; |
| 12. | After the time $T_{vcp}$ the charging current $I_B$ is measured; If $I_B < I_{low}$ the battery should be discharged $T_{dis}$ or down to the voltage $U_{dis}$. During discharge the removed charge is calculated which is subtracted from $Q_{tot}$ |
| 13. | If $Q_{tot} < Q_{max}$ the charging current is switched off during the idle period $T_{pause}$ whereupon the charging current is switched on and the charging continues from phase 5. |
| 14. | If $Q_{tot} < Q_{max}$ after a total charging time $> T_{max}$ the charging is interrupted and the indicator "ERROR" is alighted to indicate that the battery does not take charge; |
| 15. | When $Q_{tot} >= Q_{max}$ the battery is fully charged and the charging current is interrupted. The indicator "CHARGING" is alighted. |

Abbreviations:
$G_i$ = Amplification factor to DAC in the current control loop
$T_{icp}$ = maximum time for current control phase
$T_{vcp}$ = maximum time for voltage control phase
$T_{dis}$ = maximum time for discharge in the charging cycle
$I_{low}$ = minimum current for discharge in the charging cycle
$U_{dis}$ = pole voltage level where discharge should be interrupted
$U_{max}$ = û = pole voltage level for transition to voltage control
$Q_{max}$ = Amount of charge which shall be supplied to the battery to obtain full charge

I claim:
1. Method for high-rate charging of batteries with sealed cells, whereby through supplied charging current the efficiency the single battery cell is actively influenced such that the charging time and temperature rise of the cell is minimized characterized in that in a first step the battery is discharged to a voltage $U_B$ slightly higher than a first reference voltage ($U_O$) whereafter in a first recharging step the supplied charging current $I_B$ is controlled progressively increasing according to the function

$$I_B = k(U_B - U_O)$$

where k is an adjusted constant, until the pole voltage has reached a second reference voltage $$U_B = u$$

where u is maximum battery voltage.

2. Method according to claim 1 characterized in that in a second recharging step the charging current $I_B$ is controlled through voltage feedback such that $$U_B \approx u$$

whereby the amount of the supplied charging current is determined by the charging state of the battery cells.

3. Method according to claim 1 characterized in that supplied charge is measured and that the first and second recharging step is followed by a certain time interval disconnected without charging current ($T_{pause}$) contained in a charging cycle and carrying out a number of cycles until a state of full charge corresponding to a certain amount of charge ($Q_{max}$) is reached.

4. Apparatus for high-rate charging of batteries with sealed cells whereby through supplied charging current the efficiency of the signal battery cell is actively influenced such that the charging time and temperature rise of the cell is minimized, said apparatus comprising:
a control means in series with a DC current source, said control means including
a control electrode,
a measuring conductor,
summing circuit, and
a control circuit connected to the control electrode whereby the control circuit comprises a control amplifier and voltage comparators which control circuit controls the charging current in response to signals from the summing circuits which form respectively first and second differential control voltages $(U_B-U_o)$, $(u-U_B)$ where $U_o$ and $u$ are reference voltages corresponding to an initial voltage and a final voltage and $U_B$ the pole voltage of the battery supplied by way of the measuring conductor for pole voltage, one of said comparators giving a level shifted output and the other of said comparators giving a level shifted output at the voltage $u$ for recharging.

5. Apparatus according to claim 4 wherein a control unit contains memory and time generating means which is response to the level shifted outputs of the comparators shifts between first and second recharging levels are effected.

6. Method according to claim 2 wherein supplied charge is measured and the first and second recharging step is followed by a certain time interval disconnected without charging current ($T_{pause}$) contained in a charging cycle and carrying out a number of cycles until a state of full charge corresponding to a certain amount of charge ($Q_{max}$) is reached.

7. In an apparatus for high-rate charging of a battery having a control means comprising an input, output and a control electrode, said input being connected in series with a DC current source and the output of the control means being connectable to a battery for supplying a charging current thereto, the improvement comprising:
a) a source of first voltage reference ($U_o$);
b) a source of second voltage reference ($u$);
c) a first summing circuit comprising first and second inputs and an output supplying a first differential control voltage ($U_B-U^o$) from the first voltage reference and the battery pole voltage;
d) a second summing circuit comprising first and second inputs and an output supplying a second differential control voltage ($u-U_B$) from the second voltage reference and the battery pole voltage;
e) switch means comprising first and second terminals, an output terminal and a control means, said first and second terminals being connected to respective outputs of said first and second summing circuits;
f) a control circuit containing
g) an amplifier connected to the control electrode of the control means to control the charging current, an input of said amplifier being connected to the output terminal of said switch means;
h) a first voltage comparator having a first input, a second input and an output, said first input of the first voltage comparator being connected to the first reference voltage;
i) a second voltage comparator having a first input, a second input and an output, said first input of the second voltage comparator being connected to the second reference voltage;
j) a battery pole voltage sense line connected to the second inputs of each of said voltage comparators for measuring the battery pole voltage;
k) a control unit comprising first and second inputs and first and second outputs, the control unit including memory and timing circuits to control and measure the energy supplied to the battery, said first input of said control unit receiving the output signal of the first comparator, which signal terminates the first step of a recharging cycle and activates the first output connected to the control means of the switch means, the control means thereby shifting the switch to connect the input of the amplifier to the output of the second summing circuit to complete a recharging cycle in a second step; and
l) discharging means controlled by the control unit to obtain a correct initial reference level for charging, the reference level being referred to as approximately zero charge.

* * * * *